US010011092B2

(12) United States Patent
Zhou et al.

(10) Patent No.: US 10,011,092 B2
(45) Date of Patent: *Jul. 3, 2018

(54) ASPHALTIC SHEET MATERIALS INCLUDING EXPANDABLE GRAPHITE

(71) Applicant: FIRESTONE BUILDING PRODUCTS CO., LLC, Indianapolis, IN (US)

(72) Inventors: Wensheng Zhou, Carmel, IN (US); Donald R. Kirk, Indianapolis, IN (US); James Young, Indianapolis, IN (US); Robert Anderson, Chicago, IL (US); Joseph Standeford, Indianapolis, IN (US); Lance Black, Indianapolis, IN (US)

(73) Assignee: Firestone Building Products Co., LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,530

(22) Filed: Aug. 12, 2016

(65) Prior Publication Data

US 2016/0347033 A1 Dec. 1, 2016

Related U.S. Application Data

(63) Continuation of application No. 13/804,202, filed on Mar. 14, 2013, now Pat. No. 9,441,140.

(60) Provisional application No. 61/670,864, filed on Jul. 12, 2012, provisional application No. 61/684,180, filed on Aug. 17, 2012, provisional application No. 61/694,435, filed on Aug. 29, 2012.

(51) Int. Cl.
| | |
|---|---|
| *B32B 11/02* | (2006.01) |
| *B32B 11/04* | (2006.01) |
| *C08K 3/38* | (2006.01) |
| *B32B 5/16* | (2006.01) |
| *C09D 195/00* | (2006.01) |
| *E04D 12/00* | (2006.01) |
| *B32B 11/10* | (2006.01) |
| *C08L 95/00* | (2006.01) |
| *E04D 5/10* | (2006.01) |
| *E04D 3/18* | (2006.01) |

(52) U.S. Cl.
CPC ............. *B32B 11/046* (2013.01); *B32B 5/16* (2013.01); *B32B 11/02* (2013.01); *B32B 11/10* (2013.01); *C08K 3/38* (2013.01); *C08L 95/00* (2013.01); *C09D 195/00* (2013.01); *E04D 3/18* (2013.01); *E04D 5/10* (2013.01); *E04D 12/002* (2013.01); *B32B 2262/0269* (2013.01); *B32B 2262/0276* (2013.01); *B32B 2262/101* (2013.01); *B32B 2307/3065* (2013.01); *B32B 2419/06* (2013.01); *C08K 2003/387* (2013.01); *C08L 2555/50* (2013.01); *C08L 2555/84* (2013.01); *C08L 2666/55* (2013.01); *Y10T 428/31815* (2015.04); *Y10T 442/2213* (2015.04)

(58) Field of Classification Search
CPC ......... B32B 5/16; B32B 11/02; B32B 11/046; B32B 5/14; B32B 5/142; B32B 5/145; B32B 5/147; C09D 195/00; E04D 12/002; C08L 95/00; B05D 1/06; B05D 1/02; B05D 1/30
See application file for complete search history.

(56) References Cited

U.S. PATENT DOCUMENTS

| | | | |
|---|---|---|---|
| 3,574,644 | A | 4/1971 | Olstowski et al. |
| 4,437,896 | A | 3/1984 | Partanen |
| 4,835,199 | A | 5/1989 | Futamura et al. |
| 4,992,315 | A | 2/1991 | Zickell et al. |
| 5,516,817 | A | 5/1996 | Slusher et al. |
| 5,849,338 | A | 12/1998 | Richardson et al. |
| 6,084,008 | A | 7/2000 | Liu |
| 6,207,085 | B1 | 3/2001 | Ackerman |
| 6,486,236 | B2 | 11/2002 | Wollum et al. |
| 6,492,439 | B2 | 12/2002 | Wollum et al. |
| 6,544,596 | B2 | 4/2003 | Clemens et al. |
| 6,706,793 | B2 | 3/2004 | Abu-Isa et al. |
| 6,924,015 | B2 | 8/2005 | Zanchetta |
| 7,070,843 | B2 | 7/2006 | Bartek |
| 7,146,771 | B2 | 12/2006 | Swann et al. |
| 7,442,270 | B2 | 10/2008 | Bartek |
| 7,605,188 | B2 | 10/2009 | Loh et al. |
| 7,677,009 | B2 | 3/2010 | Bowman |
| 7,833,575 | B2 | 11/2010 | Gupta |
| 7,878,301 | B2 | 2/2011 | Gross et al. |
| 8,178,449 | B2 | 5/2012 | La Vietes et al. |
| 2004/0121152 | A1 | 6/2004 | Toas |
| 2005/0139126 | A1 | 6/2005 | Khan et al. |
| 2005/0145139 | A1 | 7/2005 | Khan et al. |
| 2005/0257875 | A1 | 11/2005 | Khan et al. |
| 2006/0144012 | A1 | 7/2006 | Manning et al. |
| 2006/0160978 | A1 | 7/2006 | Gupta et al. |
| 2006/0217451 | A1 | 9/2006 | Bonapersona |
| 2006/0240224 | A1 | 10/2006 | Khan et al. |
| 2006/0273290 | A1 | 12/2006 | Khan et al. |
| 2008/0102243 | A1 | 5/2008 | Gupta |
| 2008/0184651 | A1 | 8/2008 | Bowman |
| 2008/0188590 | A1 | 8/2008 | Gupta |
| 2009/0309077 | A1 | 12/2009 | Gupta et al. |
| 2009/0326117 | A1 | 12/2009 | Benussi et al. |
| 2010/0167013 | A1 | 7/2010 | Cruz et al. |
| 2011/0073239 | A1 | 3/2011 | Manning et al. |
| 2011/0173924 | A1 | 7/2011 | Ambrose, Jr. et al. |
| 2011/0185656 | A1 | 8/2011 | Klein |
| 2011/0313084 | A1 | 12/2011 | Furar et al. |
| 2012/0009407 | A1 | 1/2012 | Peeler et al. |
| 2012/0022176 | A1 | 1/2012 | Stahl et al. |

(Continued)

FOREIGN PATENT DOCUMENTS

| | | |
|---|---|---|
| CN | 2573591 | 9/2003 |
| EP | 2 532 515 A1 | 12/2012 |

(Continued)

*Primary Examiner* — Peter D. Mulcahy
(74) *Attorney, Agent, or Firm* — Thomas R. Kingsbury; Arthur M. Reginelli

(57) ABSTRACT

An asphaltic sheet comprising an asphaltic component including an asphalt binder and expandable graphite.

16 Claims, 3 Drawing Sheets

(56) References Cited

U.S. PATENT DOCUMENTS

| | | |
|---|---|---|
| 2012/0100289 A1 | 4/2012 | Egan et al. |
| 2012/0174508 A1 | 7/2012 | Brooks et al. |
| 2012/0189838 A1 | 7/2012 | Pellacani et al. |
| 2012/0266553 A1 | 10/2012 | Shiao et al. |
| 2013/0036714 A1 | 2/2013 | Bolton et al. |
| 2013/0186033 A1 | 7/2013 | Thomas et al. |
| 2014/0127443 A1 | 5/2014 | Zhou et al. |
| 2014/0141672 A1 | 5/2014 | Hubbard et al. |
| 2014/0205789 A1 | 7/2014 | Zhou et al. |
| 2014/0215937 A1 | 8/2014 | Zhou et al. |

FOREIGN PATENT DOCUMENTS

| | | |
|---|---|---|
| EP | 2 617 894 A1 | 7/2013 |
| KR | 2011-40087720 A | 8/2011 |
| KR | 20110087720 A | 8/2011 |
| RU | 2002914 | 11/1993 |
| RU | 2131964 | 6/1999 |
| WO | 2013/102208 A1 | 7/2013 |
| WO | 2015/013176 A1 | 1/2015 |

ASPHALTIC SHEET MATERIALS INCLUDING EXPANDABLE GRAPHITE

This application is a continuing application of U.S. Nonprovisional application Ser. No. 13/804,202, filed on Mar. 14, 2013, which claims the benefit of U.S. Provisional Application Ser. Nos. 61/670,864, filed on Jul. 12, 2012, 61/684,180, filed on Aug. 17, 2012, and 61/694,435, filed on Aug. 29, 2012, which are incorporated herein by reference.

FIELD OF THE INVENTION

Embodiments of the present invention are directed toward asphaltic sheet materials that include expandable graphite. These sheets materials are useful as roofing underlayment, as roofing membranes, and as barrier materials such as air, vapor, and/or moisture barriers.

BACKGROUND OF THE INVENTION

Asphaltic sheet materials are widely used in the construction industry. For example, polymer-modified asphaltic sheet material is used as membrane for waterproofing flat or low-sloped roofs. As is known in the art, these roofing systems may include multiple layers of asphaltic sheet including base sheets and cap sheets. Other examples include barriers materials such air, vapor, or moisture barriers. These materials are typically used on roofs or vertical surfaces such as walls to provide the desired air, vapor and/or moisture resistance to a structure. Still other examples include underlayments, which are used in the roofing industry to provide an extra layer of protection to the roof. This additional protection may provide, among other benefits, water or moisture, thermal, and fire resistance. As the name implies, underlayment is typically positioned below the external or primary roofing protection, which may include shingles, membranes such as polymeric or asphaltic membrane, roofing tiles, and metal panels or cladding.

With regard to underlayments, felt paper that is saturated with asphalt has historically been used as underlayment to provide additional water and/or moisture resistance to the roof. Other forms of underlayment include synthetic materials such as thermoplastic or thermoset materials formed into sheets. Composites, such as laminates of asphalt and synthetic polymer, have also been employed as underlayment.

In order to meet certain fire resistance properties, which may be required by code or classification, fire or flame resistant underlayment may be employed. These underlayment may include textiles, including woven and non-woven fabrics, made of fire resistant materials such as fiberglass. These fabrics may include a coating, such as a mineral coating, that further enhances the flame or fire resistance of the underlayment.

Where there is a desire to achieve both moisture resistance and flame or fire resistance through the use of underlayment, such as with metal roofing systems, multiple underlayments are used. For example, a first underlayment may be used to provide moisture or water resistance, and a second underlayment may be used to provide flame or fire resistance. This technique, however, suffers from several drawbacks including the added difficulty of installing multiple underlayments.

SUMMARY OF THE INVENTION

One or more embodiments of the present invention provide an asphaltic sheet comprising an asphaltic component including an asphalt binder and expandable graphite.

Still other embodiments of the present invention provide a roof system comprising a roof deck; an underlayment; and one or more metal panels covering the underlayment, where the underlayment an asphaltic component including an asphalt binder and expandable graphite dispersed within the asphalt binder.

Still other embodiments of the present invention provide a method for producing an asphaltic sheet, the method comprising preparing a molten asphaltic composition by introducing an expandable graphite to an asphalt binder at a temperature below that which will cause deleterious expansion of the expandable graphite and fabricating an asphaltic sheet with the molten asphaltic composition.

Still other embodiments of the present invention provide an asphaltic sheet comprising an asphaltic component including an asphalt binder and a layer including expandable graphite, where said layer is adjacent to said asphaltic component.

Still other embodiments of the present invention provide a method for producing an asphaltic sheet, the method comprising providing an asphaltic sheet and applying expandable graphite particles to the asphaltic sheet.

DETAILED DESCRIPTION OF ILLUSTRATIVE EMBODIMENTS

Embodiments of the present invention are based, at least in part, on the discovery of an asphaltic sheet having an asphaltic component with expandable graphite. In certain embodiments, the asphaltic sheet includes an asphalt component with the expandable graphite dispersed within the asphalt component. In other embodiments, the asphaltic sheet includes a layer of expandable graphite adjacent to the asphalt component. In one or more embodiments, the asphaltic sheet is advantageously resistant to water, moisture, an/or air due to the asphaltic nature of the sheet, and it is also flame resistant due to the presence of the expandable graphite. It is believed that one or more advantages of the present invention derive from the presence of the expandable graphite within or adjacent to the asphaltic component of the sheet. While the prior art contemplates the use of expandable graphite as a flame retardant, the prior art does not contemplate incorporating the expandable graphite into the asphaltic component of a sheet material or placing a layer of the expandable graphite adjacent to the asphaltic component. Embodiments of the present provide a method for incorporating the expandable graphite into the asphaltic component of the sheet without deleteriously expanding the graphite (i.e. the graphite is not expanded to a deleterious degree. And, in certain embodiments, the asphaltic component of the sheet material further includes a complementary flame retardant material that is believed to synergistically interact with the expandable graphite to provide unexpected flame resistance.

Sheet Construction

Figure 1:
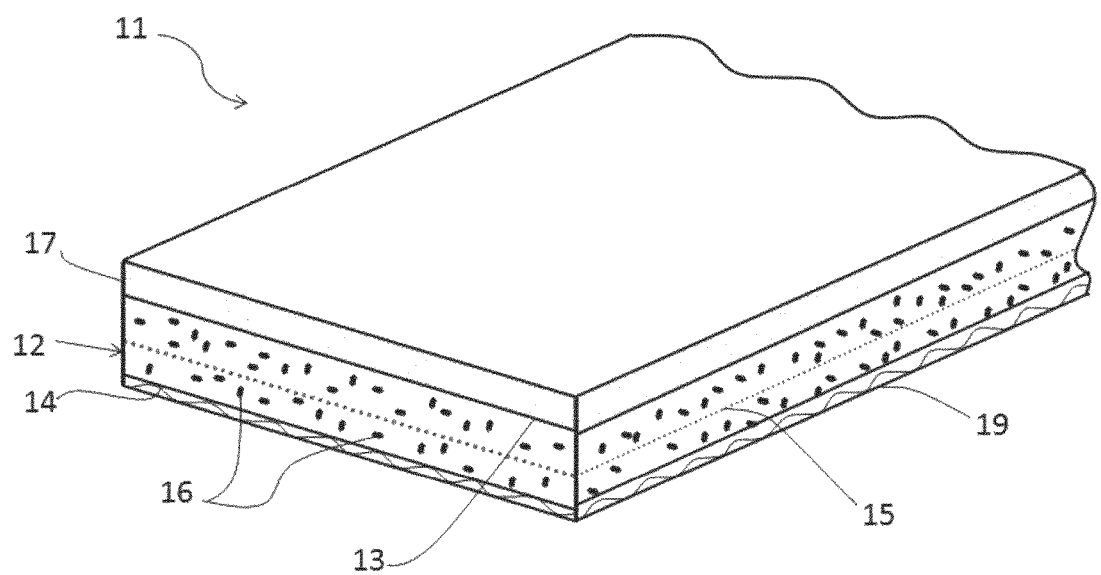
FIG. 1 is a perspective view of a cross section of an asphaltic sheet according to one or more embodiments of the present invention.

In one or more embodiments, the asphaltic sheet is or includes a planar body of asphalt material, which may also be referred to as the asphalt component of the sheet or asphalt layer 12. For example, as shown in FIG. 1, asphaltic sheet 11 includes asphalt component 12 having a first planar surface 13 and second planer surface 14. Sheet 11 may include an optional textile fabric 15 embedded or impregnated within asphaltic component 12. Asphaltic component 12, as will be described in greater detail below, may include various constituents such as polymeric modifiers and fillers, as well as expandable graphite 16 and optional complementary flame retardants (not shown) according to the present invention. In one or more embodiments, sheet 11 may further include one or more polymeric layers 17 laminated to asphalt component 12 of sheet 11. For example, asphaltic sheet 11 may include an asphaltic component 12 laminated to a polypropylene sheet. In other embodiments, layer 17 may include a layer of release agents, such as silica, sand or talc. Additionally, a release film 19 may be removably secured to at least one of the exposed planar surfaces 13 or 14.

In one or more embodiments, optional textile fabric 15, which may also be referred to as fabric reinforcement 15, reinforcing member 15, or simply reinforcement 15, may include woven and/or non-woven fabrics. Various fabric reinforcements are known in the art, and practice of the present invention is not necessarily limited by the selection of a particular fabric. In one or more embodiments, reinforcement 15 may be fabricated from fiberglass and/or synthetic yards or filaments. Exemplary synthetic yarns include those prepared from polyesters or polyimides.

In one or more embodiments, the thickness of asphaltic sheet 11 may be at least 10, in other embodiments at least 20, and in other embodiments at least 30 mils. In these or other embodiments, the thickness of asphaltic sheet 11 may be at most 120, in other embodiments at most 100, in other embodiments at most 90, and in other embodiments at most 80 mils. In one or more embodiments, the thickness of asphaltic sheet 11 may be from about 10 to about 100, in other embodiments from about 20 to about 90, and in other embodiments from about 30 to about 80 mils.

Figure 2:
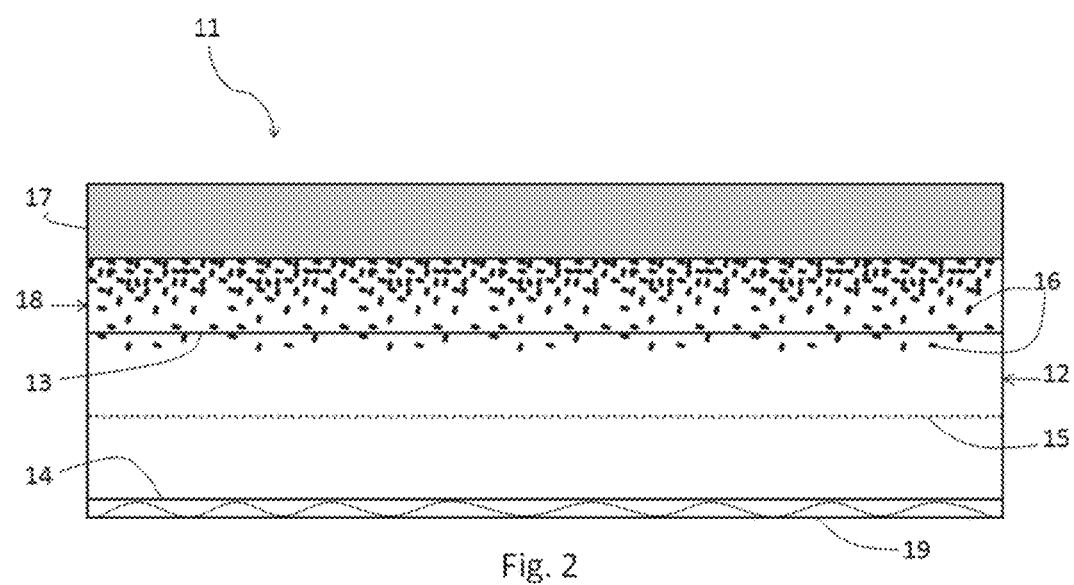
FIG. 2 is a cross-sectional view of an asphaltic sheet according to one or more embodiments of the present invention.

In other embodiments, as shown, for example, in FIG. 2, asphaltic sheet 11 includes asphaltic component 12 having first planer surface 13 and second planar surface 14. Adjacent to asphaltic component 12 is a layer 18 including expandable graphite 16. Layer 18 may be adjacent to asphaltic component 12 as a result of the manner in which asphaltic sheet 11 is fabricated, as will be described in greater detail below. Asphaltic sheet 11 may carry optional polymeric layer 17, which may also be referred to as polymeric liner 17. In other embodiments, layer 17 may include a layer of release agents, such as silica, sand or talc.

In one or more embodiments, layer 18 includes one or more layers of particles of expandable graphite 16. These particles may be held in place by a matrix of asphalt material present within at least a portion of layer 18. In these or other embodiments, the expandable graphite 16 is held in place by being adhered to the surface of the asphalt. In one or more embodiments, asphaltic component 12 may also include expandable graphite dispersed therein. In other words, asphaltic sheet may include expandable graphite dispersed throughout the asphaltic component and layer 18 of expandable graphite adjacent to component 12.

In one or more embodiments, layer 18 may include a planar region within sheet 11 that includes a higher concentration of expandable graphite relative to any other region of sheet 11. Thus, layer 18 may include a continuous layer of expandable graphite having a variable or relatively constant thickness across sheet 11. Or, in other embodiments, the expandable graphite may be discontinuous throughout the region so long as the concentration of expandable graphite within the region is higher than in other areas or regions of sheet 11. In one or more embodiments, the discontinuity of the expandable graphite within the layer 18 may result from the asphaltic material which may form a matrix in which the expandable graphite is at least partially dispersed within this region or layer. It should also be appreciated that the concentration of the expandable graphite may not be constant within this layer. Indeed, as will be appreciated from the description of how to fabricate the sheets of this embodiment, a concentration gradient may exist whereby the concentration of the expandable graphite moves from a region of maximum concentration to a region of decreased concentration. As shown in expanded view in FIG. 2, the concentration of expandable graphite 16 furthest from planar surface 13 within layer 18 is the highest, which corresponds to a minimum in asphalt concentration. On the other hand, the concentration of expandable graphite 16 proximate to planar surface 13 is a minimum relative to the concentration of expandable graphite within layer 18.

Figure 3:
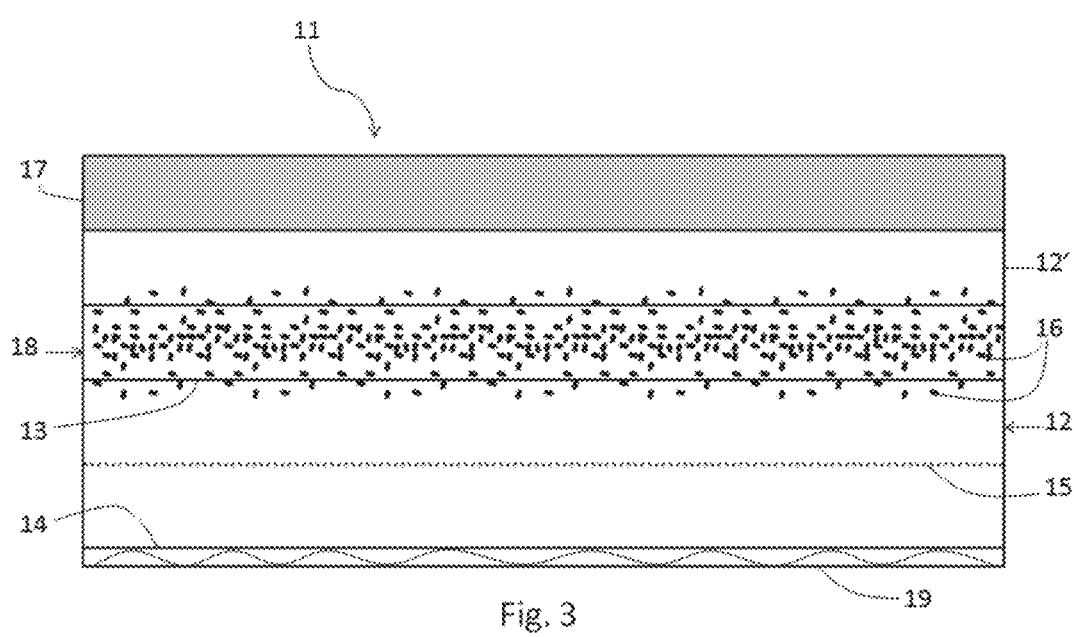
FIG. 3 is a cross-sectional view of an asphaltic sheet according to one or more embodiments of the present invention.

In yet other embodiments, which may be described with reference to FIG. 3, an additional layer of asphalt 12' is adjacent expandable graphite layer 18 opposite asphaltic component or layer 12. Layer 12' may also be referred to as a skin layer 12', and aspects of this embodiment may be described as layer or region 18 being embedded between layers of asphaltic binder or material. Consistent with the other embodiments described above, this layer 12' may include expandable graphite 16 at a concentration lower than layer 18. Nonetheless, in one or more embodiments, layer 12' may include expandable graphite dispersed therein, although the concentration is lower than the concentration of the expandable graphite within region 18. In fact, in one or more embodiments, a concentration gradient may exist between layers 12' and 18 in a similar fashion to the concentration gradient described above.

While a continuous layer or region (e.g. region 18) is believed to be advantageous, it is also contemplated that the sheet can include multiple discreet regions of the expandable graphite, such as may exist in a pattern where the expandable graphite is applied on the top of the asphaltic sheet in rows or strips in the machine direction of the sheet. This may be advantageous where greater adhesion to a top sheet (e.g. sheet 17) is desired.

In one or more embodiments, the thickness of layer 18 may be at least 10 μm, in other embodiments at least 20 μm, in other embodiments at least 30 μm, in other embodiments at least 75 μm, and in other embodiments at least 100 μm. In these or other embodiments, the thickness of layer 18 may be at most 3 mm, in other embodiments at most 2 mm, and in other embodiments at most 1 mm. In one or more embodiments, the thickness of layer 18 may be from about 10 μm to about 3 mm, in other embodiments from about 75 μm to about 2 mm, and in other embodiments from about 100 μm to about 1 mm.

In one or more embodiments, the thickness of layer 12' may be at least 2 μm, in other embodiments at least 5 μm, and in other embodiments at least 20 μm. In these or other embodiments, the thickness of layer 12' may be at most 1 mm, in other embodiments at most 0.5 mm, in other embodiments at most 0.25 mm, in other embodiments at most 0.1 mm, and in other embodiments at most 0.050 mm. In one or more embodiments, the thickness of layer 12' may be from about 1 µm to about 3 mm, in other embodiments from about 2 µm to about 0.5 mm, and in other embodiments from about 5 µm to about 0.050 mm.

Asphalt and Constituents

As noted above, the asphaltic sheet of one or more embodiments of the present invention includes an asphaltic component. The asphaltic component includes an asphalt binder and expandable graphite dispersed within the binder. The asphaltic component may also include, dispersed within the binder, polymeric modifiers, fillers, tackifiers, complementary flame retardants, and other constituents conventionally used in asphaltic-based building materials.

Asphalt Binder

The term "asphalt binder" is used as understood by those skilled in the art and is consistent with the meaning provided by AASHTO M320. As used within this specification, the terms "asphalt" and "asphalt binder" may be used synonymously. The asphalt binder material may be derived from any asphalt source, such as natural asphalt, rock asphalt, produced from tar sands, or petroleum asphalt obtained in the process of refining petroleum. In other embodiments, asphalt binders may include a blend of various asphalts not meeting any specific grade definition. This includes air-blown asphalt, vacuum-distilled asphalt, steam-distilled asphalt, cutback asphalt or roofing asphalt. Alternatively, gilsonite, natural or synthetic, used alone or mixed with petroleum asphalt, may be selected. Synthetic asphalt mixtures suitable for use in the present invention are described, for example, in U.S. Pat. No. 4,437,896. In one or more embodiments, asphalt includes petroleum derived asphalt and asphaltic residual. These compositions may include asphaltenes, resins, cyclics, and saturates. The percentage of these constituents in the overall asphalt binder composition may vary based on the source of the asphalt.

Asphaltenes include black µmorphous solids containing, in addition to carbon and hydrogen, some nitrogen, sulfur, and oxygen. Trace elements such as nickel and vanadium may also be present. Asphaltenes are generally considered as highly polar aromatic materials of a number average molecular weight of about 2000 to about 5000 g/mol, and may constitute about 5 to about 25% of the weight of asphalt.

Resins (polar aromatics) include dark-colored, solid and semi-solid, very adhesive fractions of relatively high molecular weight present in the maltenes. They may include the dispersing agents of peptizers for the asphaltenes, and the proportion of resins to asphaltenes governs, to a degree, the sol- or gel-type character of asphalts. Resins separated from bitumens may have a number average molecular weight of about 0.8 to about 2 kg/mol but there is a wide molecular distribution. This component may constitute about 15 to about 25% of the weight of asphalts.

Cyclics (naphthene aromatics) include the compounds of lowest molecular weight in bitumens and represent the major portion of the dispersion medium for the peptized asphaltenes. They may constitute about 45 to about 60% by weight of the total asphalt binder, and may be dark viscous liquids. They may include compounds with aromatic and naphthenic aromatic nuclei with side chain constituents and may have molecular weights of 0.5 to about 9 kg/mol.

Saturates include predominantly the straight- and branched-chain aliphatic hydrocarbons present in bitumens, together with alkyl naphthenes and some alkyl aromatics. The average molecular weight range may be approximately similar to that of the cyclics, and the components may include the waxy and non-waxy saturates. This fraction may from about 5 to about 20% of the weight of asphalts.

In these or other embodiments, asphalt binders may include bitumens that occur in nature or may be obtained in petroleum processing. Asphalts may contain very high molecular weight hydrocarbons called asphaltenes, which may be soluble in carbon disulfide, pyridine, aromatic hydrocarbons, chlorinated hydrocarbons, and THF. Asphalts or bituminous materials may be solids, semi-solids or liquids.

In one or more embodiments, the asphalt binder includes AC-5, AC-10 and AC-15. These asphalts typically contain about 40 to about 52 parts by weight of aromatic hydrocarbons, about 20 to about 44 parts by weight of a polar organic compound, about 10 to about 15 parts by weight of asphaltene, about 6 to about 8 parts by weight of saturates, and about 4 to about 5 parts by weight of sulfur. Nevertheless, practice of the present invention is not limited by selection of any particular asphalt.

In one or more embodiments, the molecular weight of the aromatic hydrocarbons present in asphalt may range between about 300 and 2000, while the polar organic compounds, which generally include hydroxylated, carboxylated and heterocyclic compounds, may have a weight average molecular weight of about 500 to 50,000. Asphaltenes, which are generally known as heavy hydrocarbons, are typically of a high molecular weight and are heptane insoluble. Saturates generally include paraffinic and cycloaliphatic hydrocarbons having about 300 to 2000 molecular weight.

In one or more embodiments, bitumens may be used. Bitumens are naturally occurring solidified hydrocarbons, typically collected as a residue of petroleum distillation. Gilsonite is believed to be the purest naturally formed bitumen, typically having a molecular weight of about 3,000 with about 3 parts by weight complexed nitrogen.

Expandable Graphite

Expandable graphite may also be referred to as expandable flake graphite, intumescent flake graphite, or expandable flake; and, for the purposes herein, these terms may be used interchangeably.

In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments, the expandable graphite may be characterized as having a median size in the range from about 30 µm to about 1.5 mm, in other embodiments from about 50 µm to about 1.0 mm, and in other embodiments from about 180 to about 850 µm. In certain embodiments, the expandable graphite may be characterized as having a median size of at least 30 µm, in other embodiments at least 44 µm, in other embodiments at least 180 µm, and in other embodiments at least 300 µm. In one or more embodiments, expandable graphite may be characterized as having a median size of at most 1.5 mm, in other embodiments at most 1.0 mm, in other embodiments at most 850 µm, in other embodiments at most 600 µm, in yet other embodiments at most 500 µm, and in still other embodiments at most 400 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 80% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the asphaltic component of the asphaltic sheet of the present invention, is partially expanded. In one or more embodiments, the expandable graphite is not expanded, however, to a deleterious degree, which includes that amount or more of expansion that will deleteriously the ability to form the sheet product and the ability of the graphite to serve as flame retardant at desirable levels, which include those levels that allow proper formation of the sheet. In one or more embodiments, the expandable graphite is expanded to at most 60%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature and also alternatively referred to as the temperature at which expansion of the graphite starts.

Polymeric Modifiers

In one or more embodiments, the polymeric modifier, which may simply be referred to as polymer, includes thermoplastic polymers, thermosetting elastomers, thermoplastic elastomers, and/or mixtures thereof. Each of these polymers have been used, either alone or in combination with each other to modify asphalt binders, and practice of the present invention is not necessarily limited by the selection of any particular polymeric modifier.

In one or more embodiments, the polymers may be characterized by a glass transition temperature (Tg), as measured by DSC analysis, of less than 150° C., in other embodiment less than 125° C., in other embodiment less than 100° C., in other embodiments less than 20° C., in other embodiments less than 0° C., in other embodiments less than −20° C., in other embodiments less than −35° C., and in other embodiments from about −90° C. to about −20° C. In these or other embodiments, the polymers may be characterized by a glass transition temperature (Tg), as measured by DSC analysis, of more than −20° C., in other embodiments more than 0° C., in other embodiments more than 20° C., in other embodiments more than 50° C., and in other embodiments more than 100° C.

In one or more embodiments, the polymeric modifier may be characterized by a melt index (ASTM D-1238; 2.16 kg load @ 190° C.) of less than 1,000 dg/min, in other embodiments less than 500 dg/min, in other embodiments less than 50 dg/min, in other embodiments less than 20 dg/min, in other embodiments less than 10 dg/min, and in other embodiments less than 1 dg/min. In these or other embodiments, the unsaturated polymers may have a melt index of between 3 and 15 dg/min, and other embodiments between 4 and 12 dg/min.

In one or more embodiments, the polymeric modifier may be characterized by a number average molecular weight ($M_n$) of from about 10 to about 1,000 kg/mol, in other embodiments from about 40 to about 500 kg/mol, and in other embodiments from about 80 to about 200 kg/mol. In these or other embodiments, the polymeric modifier may also be characterized by a weight average molecular weight ($M_w$) of from about 10 to about 4,000 kg/mol, in other embodiments from about 40 to about 2,000 kg/mol, and in other embodiments from about 80 to about 800 kg/mol. In one or more embodiments, the polymeric modifier may be characterized by a molecular weight distribution of from about 1.1 to about 5, in other embodiments from about 1.5 to about 4.5, and in other embodiments from about 1.8 to about 4.0. Molecular weight can be determined by gel permeation chromatography (GPC) calibrated with polystyrene standards and adjusted for the Mark-Houwink constants for the polymer in question.

The polymeric modifier may be linear, branched, or coupled polymers. Types of polymers may include both natural and synthetic polymers. Useful synthetic polymers may include polydienes or polydiene copolymers with non-diene comonomer (e.g., styrene). The copolymers may include block and random copolymers. The coupled polymers may include linearly coupled polymers (e.g. di-coupled polymers) or radially coupled polymers (e.g. tri-coupled or, tetra-coupled penta-coupled, hexa-coupled etc.). Exemplary polydienes include polybutadiene and polyisoprene. Exemplary copolymers may include random styrene-butadiene rubber, styrene-butadiene block copolymer, styrene-butadiene-styrene block copolymer, random styrene-isoprene, styrene-isoprene block copolymer, styrene-isoprene-butadiene block copolymer, random styrene-isoprene-butadiene, styrene-isoprene-styrene block copolymer, and chloroprene rubber. In one or more embodiments, the polymeric modifier include linear or radial block copolymers wherein the block copolymers include terminal styrene blocks. In these or other embodiments, the styrene content of these block copolymers may be from 0% to 50% by weight, in other embodiments from 5% to 45% by weight, and in other embodiments from 20% to 40% by weight.

In one or more embodiments, the polymeric modifier is an SBS block copolymer (i.e., poly(styrene-b-butadiene-b-styrene). In one or more embodiments, these block copolymers may be characterized by a weight average molecular weight of from about 90,000 to about 750,000, or in other embodiments from about 150,000 to about 250,000. In these or other embodiments, these polymers may be characterized by a polydispersity of up to about 1.1 or in other embodiments up to about 1.05. In particular embodiments, the SBS block copolymers have from about 27 to about 43 parts by weight of styrene.

An example of an SBS block copolymer useful for practice of the present invention is that sold under the tradename Kraton D (Kraton Polymer Group), including, for example, D1118, D1101, and D1184. Included among these polymers are SBS block linear and radial block copolymers. In particular embodiments, two block copolymers, linear and radial, can be mixed to achieve the desired results. In certain embodiments, the weight ratio of linear to radial SBS copolymers may be from about 0 to about 7 parts by weight of radial and from about 7 to about 15 parts by weight of linear SBS block copolymer.

In one or more embodiments, useful thermoplastic polymers that may be used as the polymeric modifier include polyolefins. For example, several derivatives of polypropylene are useful including those prepared by first dimerizing propylene to give 4-methyl-1-pentene and subsequently polymerizing this dimer to give poly-4-methyl-1-pentene. These polypropylenes may have a weight average molecular weight of from about 50,000 to about 250,000, or in other embodiments from about 150,000 to about 170,000. In one or more embodiments, the polydispersity may be from about 2.5 to about 3.5. The polypropylene may be further characterized by a melt temperature of from about 160° C. to about 175° C., and may have a cold crystallization temperature above 120° C.

In one or more embodiments, the polymeric modifier is isotactic polypropylene (IPP). In one or more embodiments, the IPP has at least 45 percent by weight crystallinity, or in other embodiments from about 46 to about 50 percent by weight crystallinity. Blends of atactic polypropylene and isotactic polypropylene may be used. In yet other embodiments, atactic polyalpha olefins (APAOs) may be used.

Complementary Flame Retardants

As mentioned above, the expandable graphite may be used in conjunction with a complementary flame retardant. Flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Tackifier Resin

In one or more embodiments, the asphaltic component may include tackifier resins. These resins include, but are not limited to, petroleum resins, synthetic polyterpenes, resin esters and natural terpenes, and combinations thereof. In certain embodiments, the resin modifiers soften or become liquid at temperatures of about 40° C. to about 150° C. In certain embodiments, the resin modifiers have number average molecular weights, as measured by vapor phase osmometry, below that of the polymeric material included in the polymeric film. In certain embodiments, the number average molecular weights of the resin modifiers are less than about 5,000. In other embodiments, the number average molecular weights of the resin modifiers are less than about 1,000. In additional embodiments, the number average molecular weights of the resin modifiers are from about 500 to about 1000.

In certain embodiments, the resin modifiers have ring and ball softening point of about 20° C. to about 160° C. In additional embodiments, resin modifiers have ring and ball softening points of about 40° C. to about 160° C. In still other embodiments, resin modifiers have ring and ball softening points of about 50° C. to about 160° C.

Various types of natural and synthetic resins, alone or in admixture with each other, may be used be selected as the resin modifier. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to, aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. For additional description of resin modifiers, reference can be made to technical literature, e.g., Hydrocarbon Resins, Kirk-Othmer, Encyclopedia of Chemical Technology, 4th Ed. v. 13, pp. 717-743 (J. Wiley & Sons, 1995).

In one or more embodiments, the tackifier resins include phenol-based resins. Included among the phenol-based resins are phenolic resins. These resins may include reactive phenol resins (also referred to as functionalized phenol resins), as well as unreactive resins. In one or more embodiments, the phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the phenolic resin may be formed by an acid-catalyzed reaction.

In one or more embodiments, the tackifier resin is a polybutene polymer or oligomer. In particular embodiments, polybutene oils are employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

Other Constituents

In one or more embodiments, the asphaltic component may include oil, which may also be referred to as processing oil or extender oil. These extenders may include high-boiling hydrocarbons. Examples of these oils include paraffinic oils, aromatic oils, naphthenic oils, vegetable oils, and low PCA oils including MES, TDAE, and SRAE, and heavy naphthenic oils, and various synthetic oils such as, but not limited, polybutene oils. In one or more embodiments, the oil employed is selected based upon its compatibility with the rubber, as well as its ability to provide advantageous properties to the final composition (e.g., green strength or tack). In these or other embodiments, the asphaltic component may also include fillers, extenders, antioxidants, waxes, antiozonants, and the like. Useful fillers include, but are not limited to, inorganic fillers such as calcium carbonate (i.e. limestone) and glass, such as glass beads.

Amounts

In one or more embodiments, the asphaltic component of the asphaltic sheet of the present invention includes at least 0.5, in other embodiments at least 1, in other embodiments at least 3 and in other embodiments at least 5 parts by weight expandable graphite per 100 parts by weight asphalt binder. In these or other embodiments, the asphaltic component of the asphaltic sheet of the present invention includes at most 40, in other embodiments at most 30, and in other embodiments at most 20 parts by weight expandable graphite per 100 parts by weight asphalt binder. In one or more embodiments, the asphaltic component of the asphaltic sheet of the present invention includes from about 0.5 to about 40, in other embodiments from about 1 to about 30, and in other embodiments from about 3 to about 20 parts by weight expandable graphite per 100 parts by weight asphalt binder.

In one or more embodiments, the asphaltic component of the asphaltic sheet of the present invention includes at least 0.5, in other embodiments at least 1, in other embodiments at least 3, and in other embodiments at least 5 parts by weight polymeric modifier per 100 parts by weight asphalt binder. In these or other embodiments, the asphaltic component of the asphaltic sheet of the present invention includes at most 40, in other embodiments at most 30, and in other embodiments at most 20 parts by weight polymeric modifier per 100 parts by weight asphalt binder. In one or more embodiments, the asphaltic component of the asphaltic sheet of the present invention includes from about 0.5 to about 40, in other embodiments from about 1 to about 30, and in other embodiments from about 3 to about 20 parts by weight polymeric modifier per 100 parts by weight asphalt binder.

In one or more embodiments, the asphaltic component of the asphaltic sheet of the present invention includes at least 0.5, in other embodiments at least 1, in other embodiments at least 3, and in other embodiments at least 5 parts by weight complementary flame retardant per 100 parts by weight asphalt binder. In these or other embodiments, the asphaltic component of the asphaltic sheet of the present invention includes at most 40, in other embodiments at most 30, and in other embodiments at most 20 parts by weight complementary flame retardant per 100 parts by weight asphalt binder. In one or more embodiments, the asphaltic component of the asphaltic sheet of the present invention includes from about 0.5 to about 40, in other embodiments from about 1 to about 30, and in other embodiments from about 3 to about 20 parts by weight complementary flame retardant per 100 parts by weight asphalt binder.

In one or more embodiments, the asphaltic component of the asphaltic sheet of the present invention includes at least 0.5, in other embodiments at least 1, in other embodiments at least 3, and in other embodiments at least 5 parts by weight tackifier resin per 100 parts by weight asphalt binder. In these or other embodiments, the asphaltic component of the asphaltic sheet of the present invention includes at most 40, in other embodiments at most 30, and in other embodiments at most 20 parts by weight tackifier resin per 100 parts by weight asphalt binder. In one or more embodiments, the asphaltic component of the asphaltic sheet of the present invention includes from about 0.5 to about 40, in other embodiments from about 1 to about 30, and in other embodiments from about 3 to about 20 parts by weight tackifier resin per 100 parts by weight asphalt binder.

Method of Making Sheet

In one or more embodiments, the asphaltic sheet of the present invention may generally be prepared by using conventional techniques for forming asphaltic sheet. For example, the technique may include, in certain embodiments, saturating a reinforcing textile with a molten asphalt composition. The step of saturating the sheet may include submerging the reinforcing sheet into a bath of molten asphalt. In other embodiments, the step of saturating the sheet may include spraying, roll coating, or otherwise applying a molten asphalt composition to a reinforcing sheet. Where a reinforcing sheet is not employed, a molten asphalt material can be applied to release paper or film and then processed into a sheet that is devoid of reinforcing scrim.

In certain embodiments, the molten asphalt composition is prepared by introducing the expandable graphite to a molten asphalt composition. In one or more embodiments, the temperature of the molten asphalt composition at the time of introduction of the expandable graphite is less than 270° C., in other embodiments is less than 230° C., in other embodiments less than 220° C., in other embodiments less than 210° C., in other embodiments less than 200° C., in other embodiments less than 190° C., in other embodiments less than 185° C., in other embodiments less than 175° C., in other embodiments less than 165° C., in other embodiments less than 155° C., and in other embodiments less than 145° C. In these or other embodiments, the temperature of the molten asphalt composition at the time of introduction of the expandable graphite is at least 125° C., in other embodiments at least 140° C., in other embodiments at least 150° C., in other embodiments at least 160° C., and in other embodiments at least 170° C. In one or more embodiments, these temperatures are maintained during mixing and processing in the presence of the expandable graphite.

In one or more embodiments, the molten asphalt composition is prepared in a multi-stage process whereby the asphalt binder and optionally one or more additional ingredients (e.g. polymer modifier), other than the expandable graphite, are mixed at elevated temperatures up to, for example, 250° C., in other embodiments up to 240° C., in other embodiments up to 230° C., in other embodiments up to 220° C., and in other embodiments up to 210° C. Following this initial mix, the asphaltic composition is cooled below 200° C., in other embodiments below 190° C., and in other embodiments below 185° C., in other embodiments below 175° C., in other embodiments below 165° C., in other embodiments below 155° C., and in other embodiments below 145° C.

In one more embodiments, cooling of the asphalt may take place my adding additional asphalt to the mixture, where the temperature of the added asphalt is cooler then the asphalt heated and mixed in the first step. For example, asphalts are typically flowable at temperatures as low as about 130° C. to about 150° C. Accordingly, asphalt having a temperature of about 130° C. to about 150° C. can be added to the asphalt mixture prepared in the first mixing step to quickly and homogeneously cool the asphalt.

Following the cooling step, the expandable graphite is introduced to the molten asphalt composition and mixed at temperatures of less than 200° C., in other embodiments less than 190° C., in other embodiments less than 185° C., in other embodiments less than 175° C., in other embodiments less than 165° C., in other embodiments less than 155° C., and in other embodiments less than 145° C.

In an exemplary process, a reinforcing sheet, which may be in the form of a planar sheet and may be provided in the form of a roll, is provided. In one or more embodiments, reinforcing sheet may be a scrim, or fiberglass mesh sheet, as is known in the art. Useful scrims include those that are commercially available. For example, fiberglass scrims are available under the trade name STYLE™ 930120 (Milliken & Co.; Spartanburg, S.C.) and also available from J. P. Stevens (Greenville, S.C.). In other embodiments, reinforcing sheet may be an organic felt or a combination polyester and glass mat. Useful polyester mats are available from Freudenberg & Co. of Germany. In one or more embodiments, the asphalt coater may be a reservoir of hot liquid asphalt. In other embodiments, the asphalt coater may include spraying apparatus to coat the reinforcing sheet with liquid asphalt. In yet other embodiments, reinforcing sheet may be coated with hot liquid asphalt by any alternative methods known to persons having ordinary skill in the art.

In one or more embodiments, the reinforcing sheet is drawn through an asphalt coater, which applies hot liquid (i.e. molten asphalt) to the reinforcing sheet to create a sheet that is saturated with asphalt. As noted above, the asphalt composition includes may include polymeric modifiers, fillers, and other ingredients conventionally employed with asphalt compositions.

In one or more embodiments, the asphalt composition may include the expandable graphite according to the practice of this invention. In other words, the expandable graphite is added to the molten asphalt composition prior to the introduction of the reinforcing sheet to the molten asphalt. Also included within the molten asphalt may be complementary flame retardant and other ingredients mentioned above.

In other embodiments, the molten asphalt composition is devoid or substantially devoid of expandable graphite. In these embodiments, the expandable graphite is incorporated into the asphaltic sheet downstream of the bath or reservoir of molten asphalt. For example, the expandable graphite can be dropped onto the sheet after leaving the coater.

In yet other embodiments, the expandable graphite is included in the molten asphalt composition prior to the introduction of the reinforcing sheet to the molten asphalt and the expandable graphite is incorporated into the asphaltic sheet downstream of the bath or reservoir of molten asphalt (e.g. by dropping).

In one or more embodiments, expandable graphite particles are dropped on to a sheet that has been coated with molten asphalt, wherein the asphalt may or may not include expandable graphite. These particles are dropped at a rate and μmount to create at least a partial layer of expandable graphite particles adjacent to the asphalt of the coated asphalt sheet. In one or more embodiments, the act of dropping the expandable graphite particles on to a coated sheet may at least partially embed some of the graphite particles in to the asphalt such that the asphalt serves as a binder to hold the graphite particles in place. In these or other embodiments, one or more of the plurality of expandable graphite particles are adhered to the surface of the coated asphalt sheet by way of the adhesive properties of the asphalt material. In one or more embodiments, the step of dropping the expandable graphite creates a concentration gradient of the expandable graphite and the asphalt.

In one or more embodiments, the process of dropping expandable graphite particles on to an asphaltic sheet takes place after the asphaltic sheet is prepared from a molten asphalt composition and prior to a substantial cooling of the asphalt material so as to take advantage of the adhesive properties of the asphalt. In one or more embodiments, at least a portion of the expandable graphite particles are dropped on or otherwise applied to the coated asphalt sheet within 15 seconds, in other embodiments within 10 seconds, and in other embodiments within 5 seconds of the asphaltic sheet being prepared (e.g., removal of the asphaltic sheet from a molten bath in which the asphaltic sheet is prepared). In one or more embodiments, the expandable graphite is dropped on the asphaltic sheet prior to solidification of the asphalt material (e.g. prior to the asphaltic sheet cooling to a temperature below about 85° C.

In one or more embodiments, the expandable graphite particles are applied to the surface of an asphaltic sheet using a multi-stage process. For example, a multi-stage process may include multiple drops of graphite particles. In certain embodiments, the various stages or drops can be configured to achieve certain characteristics. For example, different sized expandable graphite particles can be dropped at different stages in order to achieve desirable coverage of the surface of the asphaltic sheet.

In one or more embodiments, additional asphaltic material applied to the sheet after application of the expandable graphite (e.g. after dropping the expandable graphite onto the sheet, which can form the layer of expandable graphite or concentrated region of expandable graphite). This may take place by using curtain coating or roll coating techniques. In other embodiments, the expandable graphite is dropped onto the hot asphaltic sheet prior to the sheet being calendered or sized within a nip roll. As a result, then the sheet is calendered or sized within a nip roll, the excess asphaltic material at the nip roll will serve to form a layer (or skin) of asphaltic material over the layer of expandable graphite.

In certain embodiments, a polymeric layer is applied to the asphaltic sheet after application of the expandable graphite particles. For example, following one or more drops or applications of the expandable graphite particles to a surface of the asphaltic sheet, a polymeric film may be applied over the expandable graphite particles. In one or more embodiments, this may facilitate subsequent calendaring of the asphaltic sheet carrying the expandable graphite particles. In other embodiments, the layer of expandable graphite particles may be modified by the application of a release agent, such as sand, silica, or talc, over the expandable graphite particles. The presence of release agents may, like the polymeric film, facilitate subsequent calendaring of the asphaltic sheet.

In one or more embodiments, the asphaltic sheet may be drawn through a cooling station to cool the hot asphalt and create a more stable substrate for the application of granules. In one or more embodiments, the cooling station may include a water reservoir through which the asphaltic sheet is drawn. In certain embodiments, the asphaltic sheet may float across a water reservoir to cool the sheet while allowing the top surface to retain a higher temperature than the bottom surface. In other embodiments, the cooling station may include other cooling mechanisms known to those skilled in the art.

Industrial Applicability

In one or more embodiments, the asphaltic sheet of the present invention may be used as an underlayment. For example, the sheet may be employed as an underlayment within a metal roofing system. In one or more embodiments, the metal roofing system may include a roof deck, an optional insulation layer, the underlayment of the present invention, and metal panels, which may also be referred to as metal cladding.

Practice of the present invention is not necessarily limited by the type of roof deck. For example, the roof deck may include a flat roof, a low-slope roof, or a high-slope roof. The deck may be fabricated from wood, metal, concrete, or any material useful for fabricating a roof deck.

As is known in the art, the insulation layer may include insulation boards such as polyisocyanurate or polystyrene insulation boards. These insulation boards may be secured to the roof deck using known techniques, such as adhesive bonding or mechanical fastening.

In one or more embodiments, the underlayment may be applied directly to the roof deck and the insulation boards can be applied over the underlayment. In other embodiments, the underlayment may be applied over the optional insulation layer. Where an insulation layer is not present, the underlayment may be applied directly to the deck.

In one or more embodiments, the metal panel is then secured to the roof on top of the underlayment. Where the insulation board is applied over the underlayment, the metal panels may be secured over the insulation layer using known techniques.

In other embodiments, the asphaltic sheet of the present invention may be used as a barrier sheet, which may also be referred to as a material. These barrier materials may include air barriers, which are employed to prevent or reduce the flow of oxygen and nitrogen into and/or out of a building structure. In other embodiments, these barrier materials may include vapor barriers, which are employed to prevent or reduce the flow of water vapor into and/or out of a building structure. In yet other embodiments, these barrier materials include moisture barriers, which are employed to prevent or reduce the flow of moisture (i.e. liquid water) into and/or out of a building structure.

In one or more embodiments, the barrier sheet may be applied to a vertical surface (such as a wall) of a building structure. Using conventional techniques, the barrier may be applied to the exterior surface of a building structure prior to application of the external sheathing, such as metal wall panels, brick, composite siding, wood siding, or vinyl siding.

In still other embodiments, the asphaltic sheet may be used as a roofing membrane. For example, the asphaltic sheet may be used as a base sheet or cap sheet in an asphaltic roofing membrane system. In one or more embodiments, these asphaltic membranes are modified asphaltic membranes of the type known in the art. Examples of these membranes, albeit without the expandable graphite, are shown in U.S. Pat. Nos. 6,492,439, 6,486,236, 4,835,199, 7,442,270, 7,146,771, 7,070,843, 4,992,315, and 6,924,015, which are incorporated herein by reference.

Characteristics of Asphaltic Sheet

In one or more embodiments, the present invention provides a metal roofing system wherein the asphaltic sheet of one or more embodiments of the present invention is employed as an underlayment, and the roofing system is characterized as a Class A roofing system pursuant to UL and/or ASTM classifications. In one or more embodiments of the present invention, the asphaltic sheets of the present invention meet the performance standards of the Burning Brand test of UL 790.

Various modifications and alterations that do not depart from the scope and spirit of this invention will become apparent to those skilled in the art. This invention is not to be duly limited to the illustrative embodiments set forth herein.

What is claimed is:

1. An asphaltic sheet comprising:
   (i) an asphaltic component including an asphalt binder and a flame retardant, other than expandable graphite, dispersed within the asphalt binder, said asphaltic component including first and second planar surfaces;
   (ii) a release film removably secured to said first planar surface;
   (iii) a polymeric sheet adhesively secured to said second planar surface; and
   (iv) a concentrated region of expandable graphite at or near at least one of said first and second planar surfaces, where said concentrated region is in the form of a concentration gradient, where the concentration of expandable graphite within the gradient changes from a plane of maximum concentration to a plane of minimum concentration.

2. The asphaltic sheet of claim 1, where said concentrated region of expandable graphite is at or near said second planar surface and is sandwiched between said asphaltic component and said polymeric sheet.

3. The asphaltic sheet of claim 1, where said asphaltic component includes from about 0.5 to about 40 parts by weight flame retardant, other than expandable graphite, per 100 parts by weight asphalt binder.

4. The asphaltic sheet of claim 1, where said asphaltic component includes from about 3 to about 20 parts by weight flame retardant, other than expandable graphite, per 100 parts by weight asphalt binder.

5. The asphaltic sheet of claim 1, where the asphaltic component further includes a polymeric modifier dispersed within the asphalt binder.

6. The asphaltic sheet of claim 5, where the polymeric modifier is selected from the group consisting of polybutadiene, polyisoprene, styrene-butadiene rubber, styrene-butadiene block copolymer, styrene-butadiene-styrene block copolymer, random styrene-isoprene, styrene-isoprene block copolymer, styrene-isoprene-butadiene block copolymer, random styrene-isoprene-butadiene, styrene-isoprene-styrene block copolymer, and chloroprene rubber.

7. The asphaltic sheet of claim 1, where the polymeric sheet is a polypropylene sheet.

8. The asphaltic sheet of claim 1, where said flame retardant, other than expandable graphite, is colemanite.

9. The asphaltic sheet of claim 1, where said polymeric sheet is a polyolefin sheet.

10. A method forming an asphaltic composite, the method comprising:
    (i) providing an asphaltic sheet, where the asphaltic sheet includes an asphaltic binder and a flame retardant dispersed within said asphaltic binder, and where said asphaltic sheet includes first and second planar surfaces;
    (ii) dropping expandable graphite on to the first planar surface of the asphaltic sheet to form a concentration gradient of the expandable graphite, wherein the concentration of the expandable graphite decreases from said first planar surface to said second planar surface of said asphaltic sheet;
    (iii) laminating a polymeric sheet to the first planar surface of the asphaltic sheet; and
    (iv) removably securing a release film to the second planar surface of the asphaltic sheet.

11. The method of claim 10, where said step of providing an asphaltic sheet includes submerging a fabric into molten asphalt binder.

12. The asphaltic sheet of claim 1, where said step of laminating a polymeric sheet includes contacting a polymeric sheet to the first planar surface and allowing the adhesive properties of the asphaltic sheet to mate the asphaltic sheet and the polymeric sheet.

13. The method of claim 12, where said step of laminating sandwiches at least a portion of the expandable graphite between the polymeric sheet and the asphaltic binder.

14. The method of claim 10, where the flame retardant is colemanite.

15. The asphaltic sheet of claim 1, where said concentration gradient is formed by dropping expandable graphite onto a molten asphaltic sheet.

16. The method of claim 10, where said step of dropping includes dropping expandable graphite in particulate form.

* * * * *